US010200491B2

(12) United States Patent
Laybovitz (10) Patent No.: US 10,200,491 B2
(45) Date of Patent: Feb. 5, 2019

(54) SYSTEMS AND METHODS FOR HTTP MESSAGE CONTENT MODIFICATION STREAMING (71) Applicant: ROUTIER LTD., Rishon Lezion (IL)

(72) Inventor: Guy Laybovitz, Rishon Lezion (IL)

(73) Assignee: ROUTIER LTD., Rishon Lezion (IL)

( * ) Notice: Subject to any disclaimer, the term of this patent is extended or adjusted under 35 U.S.C. 154(b) by 0 days.

(21) Appl. No.: 15/360,090

(22) Filed: Nov. 23, 2016

(65) Prior Publication Data

US 2017/0078431 A1    Mar. 16, 2017

Related U.S. Application Data (63) Continuation of application No. PCT/IL2015/051006, filed on Oct. 7, 2015.

(60) Provisional application No. 62/060,695, filed on Oct. 7, 2014.

(51) Int. Cl.
*G06F 15/16* (2006.01)
*H04L 29/08* (2006.01)
*H04L 29/06* (2006.01)
*G06Q 30/02* (2012.01)

(52) U.S. Cl.
CPC ..... *H04L 67/2823* (2013.01); *G06Q 30/0277* (2013.01); *H04L 65/1089* (2013.01); *H04L 65/4084* (2013.01); *H04L 65/605* (2013.01); *H04L 67/02* (2013.01); *H04L 67/42* (2013.01); *H04L 69/22* (2013.01)

(58) Field of Classification Search
CPC ............... H04L 65/4084; H04L 65/605; H04L 65/1089; G06F 17/30; G06F 3/048
See application file for complete search history.

(56) References Cited

U.S. PATENT DOCUMENTS

| 7,801,978 | B1 * | 9/2010 | Susai | H04L 29/06 709/217 |
| 2004/0003032 | A1 | 1/2004 | Ma et al. | |
| 2004/0205149 | A1 * | 10/2004 | Dillon | G06F 17/30902 709/217 |
| 2006/0031404 | A1 | 2/2006 | Kassab | |
| 2007/0244987 | A1 * | 10/2007 | Pedersen | H04L 63/0272 709/217 |
| 2008/0077952 | A1 | 3/2008 | St Jean et al. | |

(Continued)

FOREIGN PATENT DOCUMENTS

WO    2008056358 A2    5/2008

OTHER PUBLICATIONS

International Search Report & Written Opinion for PCT/IL2015/051006 Completed Feb. 7, 2016; dated Feb. 11, 2016 13 pages.

*Primary Examiner* — Benjamin M Thieu
(74) *Attorney, Agent, or Firm* — The Roy Gross Law Firm, LLC; Roy Gross (57) ABSTRACT A content-overlay system adapted for creating a content layer displayed on a mobile device, without installing an additional application on the mobile device. A selection module reviews content requests and identifies when a mobile device requests content from a source that is targeted for content addition. An insertion module modifies HTTP protocol data without buffering, thus creating a content layer that is displayed on the mobile device, without installing any additional application on the mobile device.

20 Claims, 7 Drawing Sheets (56) References Cited

U.S. PATENT DOCUMENTS

| | | | |
|---|---|---|---|
| 2008/0256254 A1* | 10/2008 | Kim | H04N 21/2381 |
| | | | 709/231 |
| 2008/0307041 A1* | 12/2008 | Bouazizi | H04L 12/189 |
| | | | 709/203 |
| 2009/0063264 A1* | 3/2009 | Leung | G06F 17/30867 |
| | | | 705/14.39 |
| 2010/0023398 A1 | 1/2010 | Brown et al. | |
| 2010/0057830 A1 | 3/2010 | Takala | |
| 2010/0269030 A1 | 10/2010 | Dugonjic et al. | |
| 2011/0178854 A1 | 7/2011 | Sofer et al. | |
| 2011/0191414 A1* | 8/2011 | Ma | H04L 65/608 |
| | | | 709/203 |
| 2012/0047284 A1* | 2/2012 | Tarkoma | H04L 67/06 |
| | | | 709/247 |
| 2012/0233228 A1* | 9/2012 | Barton | H04L 67/06 |
| | | | 707/827 |
| 2012/0331376 A1 | 12/2012 | Gorokhovsky et al. | |
| 2013/0054972 A1* | 2/2013 | Thorwirth | H04N 21/23439 |
| | | | 713/176 |
| 2013/0055384 A1* | 2/2013 | Shulman | H04L 63/1425 |
| | | | 726/22 |
| 2013/0311612 A1* | 11/2013 | Dickinson | G06F 17/301 |
| | | | 709/219 |
| 2014/0211813 A1* | 7/2014 | Gochi Garcia | H04L 69/04 |
| | | | 370/477 |

\* cited by examiner

SYSTEMS AND METHODS FOR HTTP MESSAGE CONTENT MODIFICATION STREAMING

RELATED APPLICATIONS

This application is a Continuation of PCT Patent Application No. PCT/IL2015/051006 having International filing date of Oct. 7, 2015, which claims the benefit of priority of U.S. Patent Application No. 62/060,695 filed on Oct. 7, 2014. The contents of the above applications are all incorporated by reference as if fully set forth herein in their entirety.

TECHNICAL FIELD

The present invention relates to streaming content in general, and in particular to streaming modified HTTP message content.

BACKGROUND ART

Commercial entities such as businesses as well as non-commercial entities seek to communicate with their clients, users, prospects or people in their geographical proximity. Such entities can communicate with their clients and prospects in several ways including paying for commercial messages and advertisements, hoping the clients and prospects go to the entities Web site or hope the clients and prospects download and the entity's dedicated application for a mobile device.

While paying for commercial messages and advertisements costs money, waiting for clients and prospects to go to a Web site or download and open an application leave the initiative to the client and prospect and the entity has no mean to ensure that its messages are seen by the client or prospect.

There is thus a need to provide entities with technology to push their content to users and prospects without requiring any effort or initiative from the recipients of the content.

SUMMARY OF INVENTION

It is an object of the present invention to provide systems and methods for streaming content.

It is another object of the present invention to provide systems and methods for overlaying a content stream.

It is a further object of the present invention to provide systems and methods for modifying HTTP content.

It is yet another object of the present invention to provide systems and methods for modifying HTTP content without buffering.

The present invention relates to a content-overlay system adapted for creating a content layer displayed on a mobile device, without installing an additional application on said mobile device, the system comprising:

(i) a selection module adapted for reviewing content requests and identifying when a mobile device requests content from a source that is targeted for content addition;

(ii) an insertion module adapted for modifying HTTP protocol data without buffering thus creating a content layer that is displayed on said mobile device, without installing any additional application on said mobile device.

In some embodiments, the modifications performed by the insertion module comprise insertion, deletion, replacement of content in HTTP session or any combination thereof.

In some embodiments, the mobile device is connected to the content-overlay system via a WiFi wireless network.

In some embodiments, the content-overlay system is installed within a router.

In some embodiments, the content-overlay system is installed within an Internet Service Provider (ISP).

In some embodiments, the content-overlay system is a proxy.

In some embodiments, the selection module identifies sources targeted for content addition according to a webpage URL, the content of a webpage, or both.

In some embodiments, the system is located between a mobile device and a router in a WiFi network.

In some embodiments, the system is located within a router or access point in a WiFi network.

In some embodiments, the system is provided as a cloud-based service.

In some embodiments, the insertion module replaces in HTTP headers "Content-Length" headers with "Transfer-Encoding: chunked" header.

In some embodiments, the insertion module inserts and/or modifies the HTTP header "Content-Length" with other headers that allow streaming modified HTTP.

In another aspect, the present invention relates to a computerized content-overlay method comprising a processor and memory for creating a content layer displayed on a mobile device, without installing an additional application on said mobile device, the method comprising:

(i) reviewing content requests and identifying when a mobile device requests content from a source that is targeted for content addition;

(ii) modifying HTTP protocol data without buffering thus creating a content layer that is displayed on said mobile device, without installing any additional application on said mobile device.

MODES FOR CARRYING OUT THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The system of the invention helps enterprises push content to their clients. The term "enterprises" as referred herein comprises commercial businesses, non-commercial organizations, non-profit organizations, government organizations or private groups. The term "clients" as referred herein comprises paying clients, non-paying clients, users, end-users, prospects, guests, people inside the premises of an enterprise, people in the vicinity of a the premises of an enterprise or anybody to which the enterprise wishes to send content to.

The present invention relates to a content-overlay system adapted for creating a content layer displayed on a mobile device of a client of the enterprise. The term "mobile device" as referred herein comprises smartphones, mobile phones, tablets, Personal Data Assistants (PDA's), notebook computers, laptops, mobile game consoles or any user device capable to connect to the Internet and view content including desktop computers.

In some embodiments, a proxy (such as router or network bridge) is adapted to modify HTTP protocol data without buffering, where modifications comprise insertion, deletion, replacing content in HTTP session or any combination thereof. For instance, new content, scripts and/or any other valid HTML elements may be injected to an existing webpage and/or between webpages.

The modification may be done according to a webpage URL or/and its content taking into consideration additional parameters such as location, establishment, date and time etc., typically by targeting (e.g. emplacing the overlay) according to HTTP parameters (for example, as defined by RFC 2616) such as:

HTTP Version (REQUEST HEADERS);
URL (REQUEST HEADERS);
User-Agent (Mobile/Desktop) (REQUEST HEADERS); and
Other contents of the HTTP session (e.g RESPONSE HEADER and/or RESPONSE BODY).

The system uses HTTP version to parse and handle the connection differently according to the relevant protocol. The URL is sent as a request header ("Host") and the proxy of the invention uses this header to determine if the content should be displayed or not according to pre-configured black-lists and white-lists. The user agent request header is being used to display the content in the optimal way that matches each device characteristics. In addition, the system uses a response header: Content-Type which specifies the type of the content (html, json, image, etc). This header allows the system to make some optimizations by parsing only html content. Another header used is the "Content-Encoding" (response header). The system uses this header to detect "gzip" encoding and parse it accordingly.

Some of the content (such as images or scripts, for instance) may be filtered out so the overlay will be only on relevant HTML pages.

In modifying HTTP RESPONES, typically, the server sends a proxy a response and the proxy commits to the response's size (Content-Length) and/or send compressed data (Content-Encoding). This could require the proxy to commit to a different Content-Size before the overlay is inserted. An advantage of the proxy of the invention is agnosticity to these issues since the proxy doesn't commit to a specific size.

Benefits of streaming as described herein may include that data may not entirely saved in the proxy, hence the latency penalty is reduced and less memory is being used.

Definitions

Data Block is intended to include data from the Network interface (an IP packet) or networking payload after the operating system processing (i.e the output of read operation from a POSIX compatible socket).

Proxy—is intended to include a server that tunnels data from the client to the server (in any point of the network topology).

HTTP Session—is intended to include an http request followed by a http response e.g. as described in RFC 2616

Figure 1A:
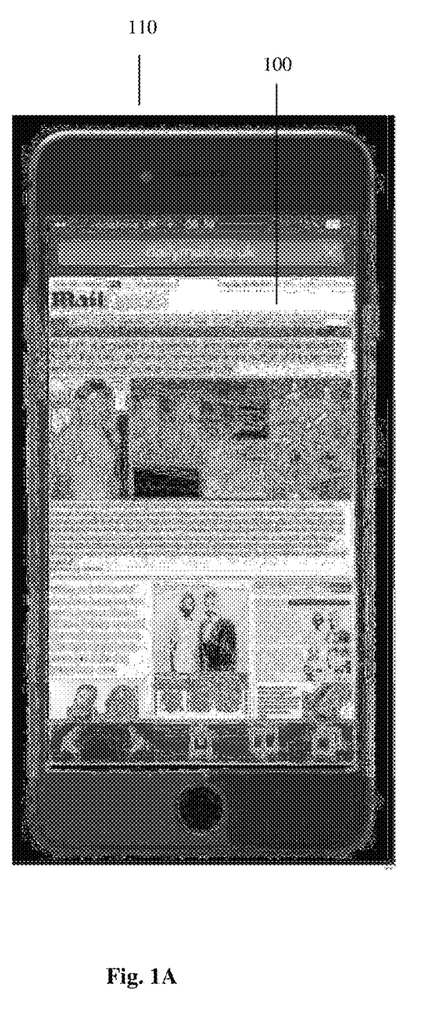
FIGS. 1A-1B show an example of a mobile phone with a content screen of the art (FIG. 1A) and the same screen with a content overlay layer (FIG. 1B).
Figure 1B:
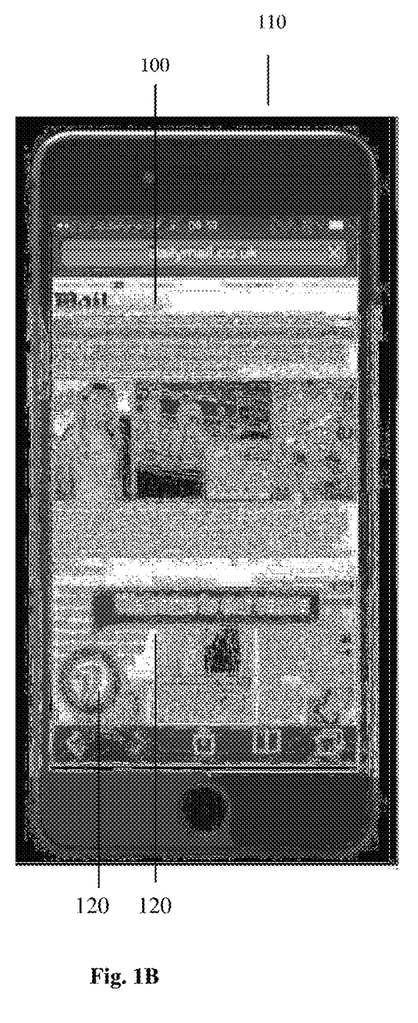

The content-overlay system of the invention is adapted for pushing content to a client's mobile device without installing an additional application on the mobile device. The pushed enterprise content forms an overlay layer over another content (web site) requested by the client. FIG. 1A shows a content page of the art 100 (news page) displayed on a mobile device 110, a smartphone. FIG. 1B shows the same news page 100 displayed but with a content overlay layer 120 on the bottom part of the screen showing a designed circle form with a bubble text "Welcome to our venue". The overlaid content 120 can be interactive, for example, by selecting or touching any portions of it, additional content can be displayed (more information about a topic, selecting user preferences etc.). Once the user interacts with the overlaid content 120, the additional content requested can cover part or all of the mobile device's 110 screen.

One solution for inserting, replacing or deleting HTTP content would be to store the entire content then modify, and only when the entire new page is ready, to serve it again with the modified content. An example of this embodiment is illustrated in the sequence diagram in FIG. 2.

Figure 2:
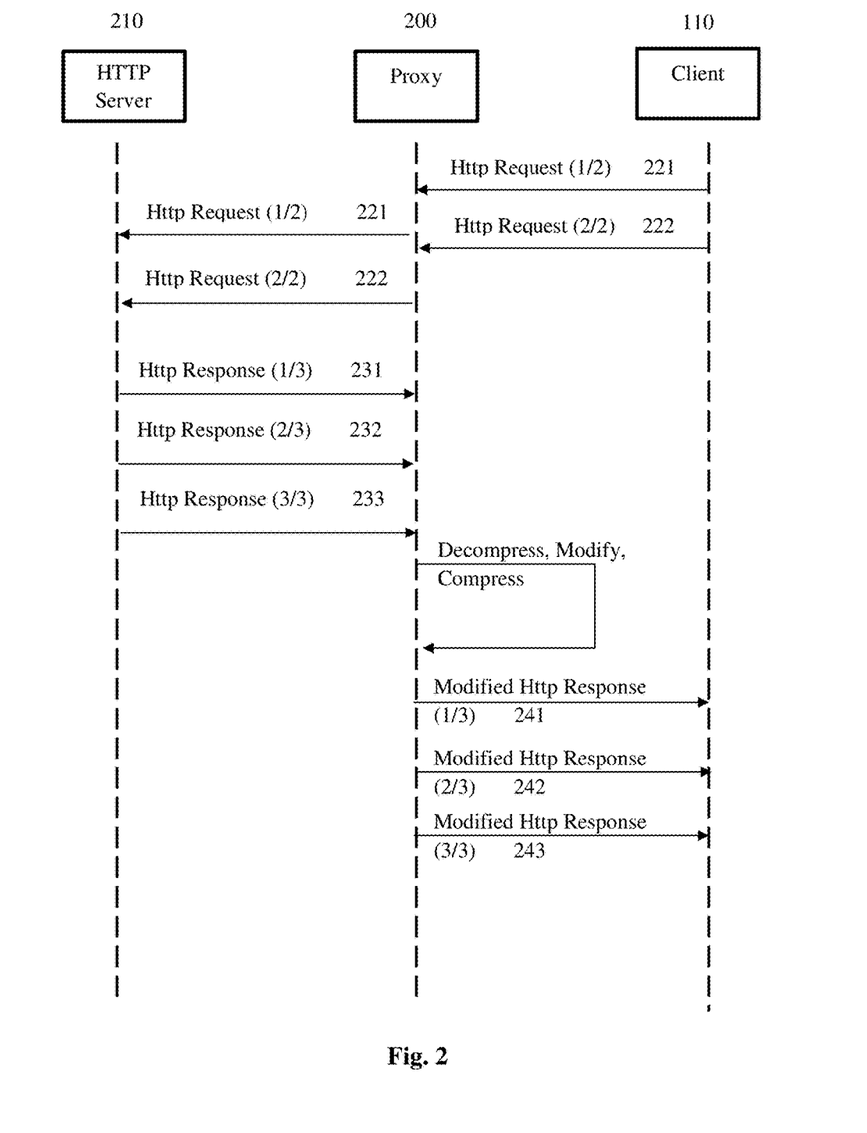
FIG. 2 is a flow diagram showing a client requesting content from a server through the proxy of the invention. Proxy sends modified content to client, only after all content is received from the server.

As shown in FIG. 2, when the mobile device 110 sends a request for content 100, typically an HTTP request, the content-overlay system of the invention can serve as a proxy 200 between the client (mobile device) 110 and server 210 (HTTP server). Initially, the client 110 sends an HTTP request, in this case in 2 data blocks 221, 222. The proxy of the invention 200 does not interfere with the client's 110 request 221, 222 and passes the request 221, 222 as is to the server 210.

Upon receiving the request 221, 222, the server 210 sends the HTTP response e.g. in three data blocks 231, 232, 233. The server 210 response is received by the proxy 210.

The proxy 210 then buffers the received information 231, 232, 233. The content-overlay system of the invention comprises a selection module configured for reviewing content and identifying when a mobile device 110 requests content 100 from a source that is targeted for content addition. The selection module of the proxy 210 thus examines the server's 220 response 231, 232, 233 and decides if this HTTP session needs to be modified or not. If it does, the content is changed, and the raw content is sent with a new content-length 241, 242, 243. If the selection module determines that the requested content should not be changed, the original server 220 response 231, 232, 233 is passed on to the client 110 (not shown in FIG. 2).

Figure 3:
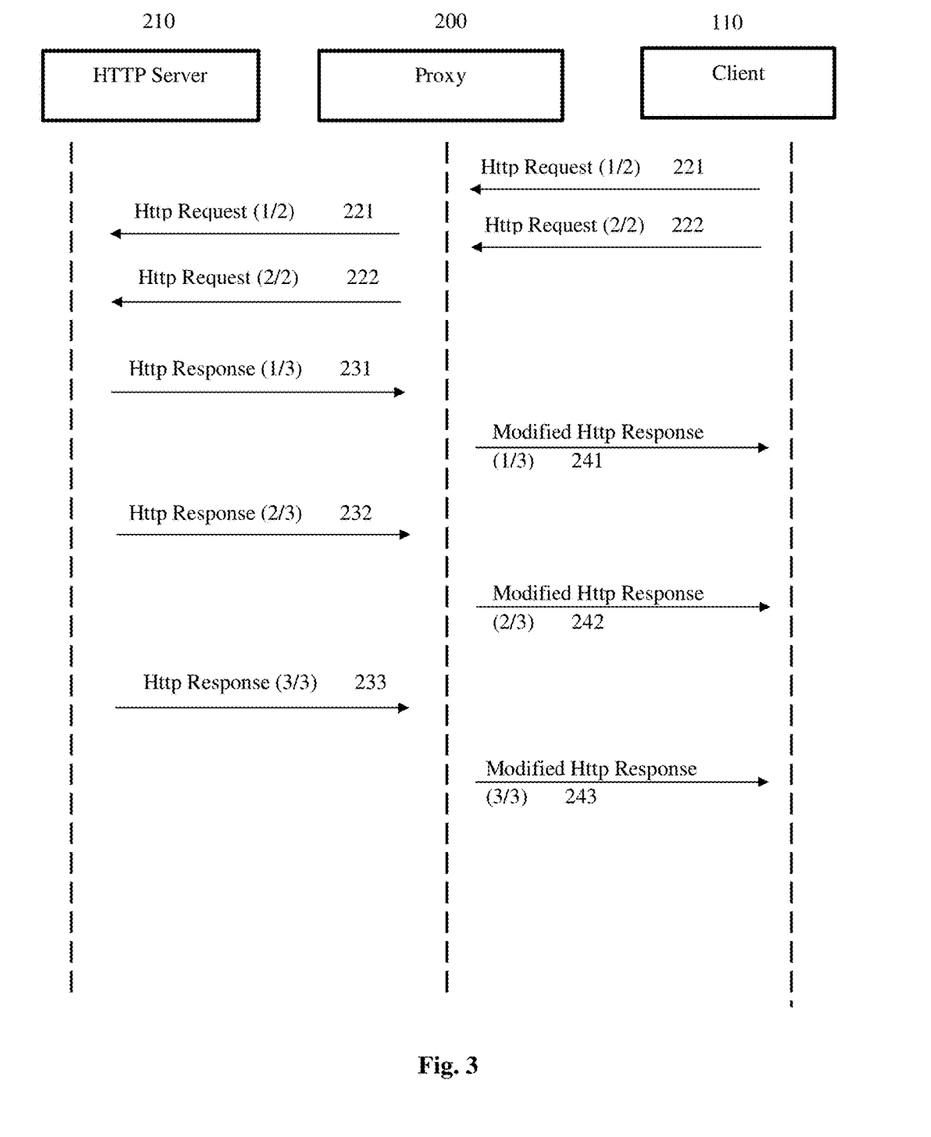
FIG. 3 is a flow diagram showing a client requesting content from a server through the proxy of the invention. Proxy sends modified content to client as soon as a content is received from the server.

Reference is now made to FIG. 3, showing a similar client 110, proxy 200 and server 210 flow as in FIG. 2, except data blocks 231, 232, 233 are not buffered at the proxy 200; Instead each data block is processed, modified according to selection module, and then passed directly to the client 110. In some embodiments, server responses 241, 242, 243 are modified to include the HTTP response header "Transfer-Encoding: chunked", in contrast to using the content-length mechanism, described above for FIG. 2. Typically, if selection module determines that the data 231, 232, 233 is filtered out (i.e not targeted for an overlay), HTTP RESPONSE HEADERS 231, 232, 233 may be sent from the proxy 200 to the client 110 as-is. If the data is targeted (for instance by the HTTP REQUEST HEADERS), the RESPONSE headers 231, 232, 233 may be modified 241, 242, 243. The data may even subsequently be filtered-out again (on RESPONSE BODY). After the header is changed it is not certain if the system needs to modify any data because when the system modifies data it searches for specific HTML tags which might not be included in the specific response.

There exist two options to filter-out data. The first option relates to REQUST HEADERS (for instance, if the client 110 requests a video (http://youtube.com/video.mpg), the proxy 200 can filter out by recognizing the url extension, or by detecting the value of the response header "Content-Type", ".mpg" in this case. The second option relates to the request BODY—if the client 110 requests a url which is just a raw data (i.e analytics or AJAX), the proxy 200 can only determine that it is a non-injection content such as xml/json (that should be filtered out) from the content itself and not from the url.

In the configuration of FIG. 2, the proxy 200 needs to receive all the data 231, 232, 233 from the server and only after receiving everything, it starts transmitting it to the client 110. In the configuration of FIG. 3, the proxy 200 does not wait to receive all the data 231, 232, 233 from the server before sending it to the client 110. Each HTTP response received is immediately transmitted to the client 110 without waiting for all the HTTP responses to arrive first at the proxy 200.

For example, assuming each response takes 200 milliseconds (ms) to transmit (assuming same time from server 210 to proxy 200 as from proxy 200 to client 110), in FIG. 2 the server 210 will take 3*200 ms that 600 ms to transmit all data and afterwards the proxy 200 will take an additional 600 ms to transmit all data, so the entire operation will take 1,200 ms. In FIG. 3 the entire operation will take only 800 ms, because the proxy 200 will start sending data to the client 110 immediately after receiving the first HTTP response 231.

It can be said that the process on FIG. 3 is a non-blocking operation because it doesn't block the proxy 200 from sending the data to the next side.

Typically, in the selection module HTTP sessions that are not targeted for content overlay, are filtered as per the following:

1. HTTP REQUEST HEADERS—if the proxy 200 determines that the HTTP request headers 221, 222, 223 are not targeted for modification, the HTTP request 221, 222, 223 and response 231, 232, 233 are passed as-is to the server 210 and client 110 accordingly.
2. HTTP RESPONSE HEADERS—if the proxy 200 determines that the HTTP response headers 231, 232, 233 are not targeted for modification, the proxy 200 sends the HTTP response 231, 232, 233 to the client 110 as-is.
3. HTTP RESPONSE BODY—at this stage, the HTTP response headers 231, 232, 233 may already have been modified, but the overlay is not placed in the body.

Figure 4:
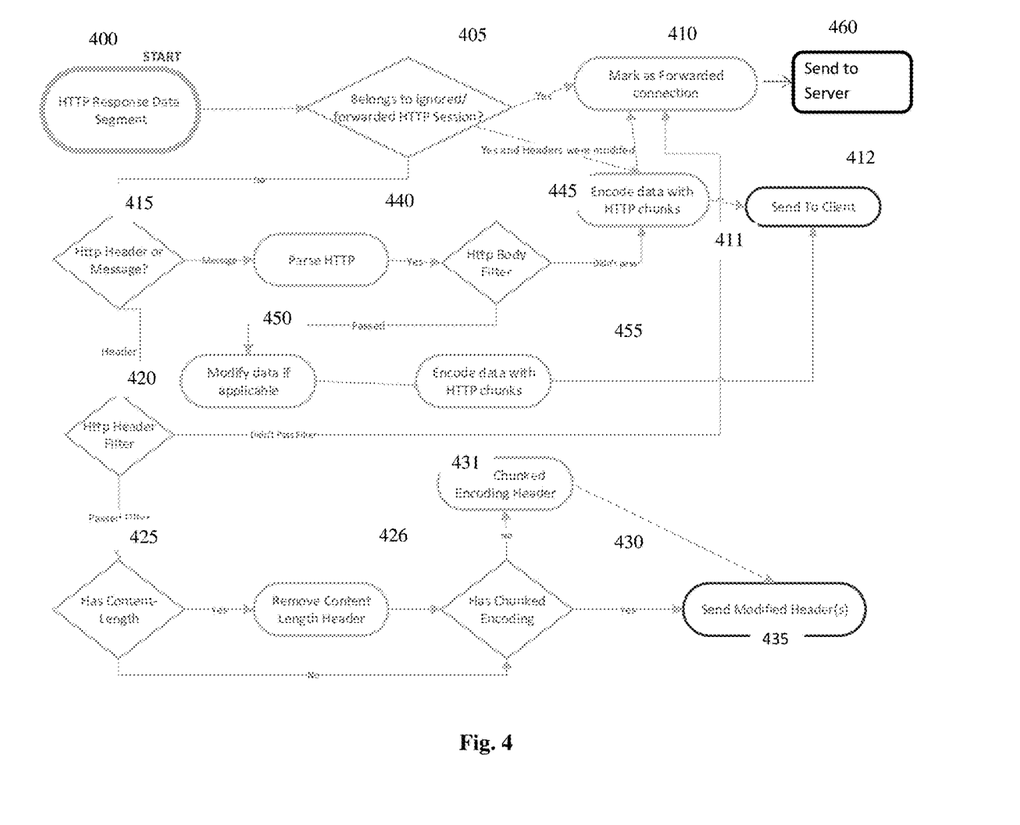
FIG. 4 is a decision tree of an embodiment of the selection and insertion modules of the invention.

Reference is now made to FIG. 4 showing a decision tree of an embodiment of the selection and insertion modules of the invention. The insertion module is adapted for modifying HTTP protocol data without buffering thus creating a content layer 120 that is displayed on the mobile device 110, without installing any additional application on the mobile device 110.

Any or all of the illustrated operations in FIG. 4 may be provided, suitably ordered as shown in or in alternative orders easily understood by a man skilled in the art. A mechanism for direct forwarding is set in order to not modify the HTTP Session and pass it directly as-is to the server 210. A connection may be added to the "forwarded session table" by a HTTP header value and/or depending on body content.

First, every HTTP header is examined. In some embodiments, the process of the invention removes the "Content-Length" headers if applicable and replaces them with "Transfer-Encoding: chunked" header. Then, the entire response is sent to the client 110 using chunked Transfer-Encoding e.g. as described in RFC 2616 section 3.6 of the HTTP protocol.

The proxy 200 is typically configured to perform some or all of the following operations, suitably ordered e.g. as follows (order can be easily changed by any person skilled in the art), for each HTTP response:

1. If the selection module determines that the HTTP content is not for modification—then the data is forwarded as is without any modification by the proxy.
2. For HTTP headers that are determined by the selection module to be modified:
   a. Remove "Content-Length" header to the HTTP headers, if present; and
   b. Add "Transfer-Encoding: Chunk" headers to the HTTP headers, if not present;
3. For HTTP Body (message) that is determined by the selection module to be modified:
   a. Decode each data block (decompress and/or remove chunk header) according to the response headers;
   b. Modify the HTTP content (i.e inject new HTML content); and
   c. Wrap in chunks described in RFC 2616 section 3.6.

In FIG. 4, in step 400 the process starts when the selection module parses the HTTP response data. In step 405, the selection module determines whether the content (HTTP session) should be selected for modification (content overlay) or ignored (passed as is, without any modification). If the HTTP session is determined as not to be marked for modification, it is marked as a forwarded (as-is) connection in step 410 because the system needs to wait until it gets all the headers from the responses and only after that it can start sending back the responses to the client 110. If the HTTP Headers were modified than in step 411 the data is encoded with the "HTTP chuncks" tag and step 410 is executed and also the encoded data is sent to the client 110 in step 412. If in step 405, the HTTP session is determined as to be modified, in step 415 the insertion module determines if the HTTP response data is an HTTP header or Message (body). After step step 410, the HTTP session is forwarded to the Server in step 460.

If it's an HTTP header, in step 420 the insertion module determines if an HTTP Header filter was passed by the selection module. A Header Filter is an optimization process that checks the value of Content-Type header to see if the resource that we get is HTML—injection should be done or image/json/file/etc—injection should not be done. If no HTTP Header filter was passed, then the HTTP Header is marked not for modification in next step 410. If a filter was passed in the HTTP Header, than the insertion module reviews in step 425 if a "Content Length" tags exists, and if so the "Content Length" tag is removed in step 426. Next, in step 430 the insertion module verifies whether the HTTP Header contains the "Chuncked encoding" tag, and if not adds it in step 431. Next, in step 435, the modified message header is sent to the client 110.

If in step 415 it was determined that it's an HTTP message, than in step 440 the HTTP message is parsed. In step 445 it is determined whether an HTTP Body filter was passed, and if not then step 411 is executed as explained above.

If step 445 determines that an HTTP Body filter has been passed, then in step 450 data is modified if applicable, and the data is encoded with the "HTTP Chunks" tag in step 455. Then the encoded data is sent to the client 110 in step 412.

Network Topology

The content-overlay system of the invention can be deployed in different locations in a network environment. The description below details a few examples, but upon reading this specification, any person skilled in the art will immediately realize other possible locations to deploy the content-overlay system of the invention, and all these alternatives are deemed to be encompassed by the invention.

Access Point Mode

Figure 5:
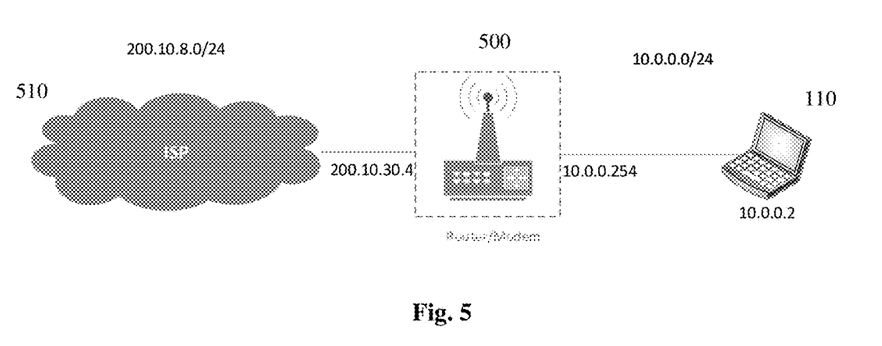
FIG. 5 shows an embodiment of a content-overlay system in an access point network configuration.

In the configuration shown in FIG. 5, the content-overlay system is located inside the network AccessPoint/Router 500. That means that the client 110 is provided with a different IP address subnet from subnet that was provided by the ISP 510 (known as NAT, Network Address Translation).

In the example shown in FIG. 5, the ISP 510 represents the global internet subnet of 200.10.8.0/24 (an arbitrary value for illustration). The address 200.10.30.4 has been assigned to the modem/router 500. The router 500 creates the LAN subnet of 10.0.0.0/24, and is assigned to the address 10.0.0.254. The client device 110 receives the address 10.0.0.2.

The content-overlay system is located in the router 500, and alters selected HTTP sessions.

Non Transparent Bridge

Figure 6:
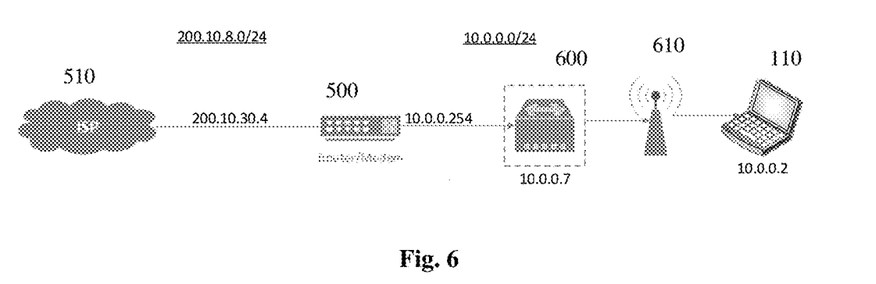
FIG. 6 shows an embodiment of a content-overlay system in non-transparent bridge.

Reference is now made to FIG. 6 showing the router 500 connected to the ISP 510, and the content-overlay system is placed as a network bridge 600 between any two network elements and access points, for example, the modem/router 500 and the access point 610.

In the FIG. 6, the router 500 is connected to one or many access points 610 that provide the same subnet as the router 500.

In the non-transparent bridge configuration, the proxy bridge 600 acts as a router within the same network. The router 500 assigns addresses both to the proxy bridge 600 and to the client 110. The bridge 600 may maintain a first HTTP connection between the server 210 and itself, and a second HTTP connection between the end user's mobile device 110 and itself. In other words, the client's 100 network address in the first connection is translated to the bridged proxy 600 network address in the second connection.

So for example, in the FIG. 6 the router 500 may only receive HTTP transactions from 10.0.0.7 and not from 10.0.02.

Transparent Bridge

Here, the setup is the same as a non-transparent bridge, but no address translation is done as the bridge 600 imitates the end users' IP addresses and possibly their MAC addresses. Unlike the non-transparent bridge configuration, in the transparent bridged proxy configuration the router 500 receives connections with the actual network address of the client 110. In other words, the router 500 may see HTTP data from all the end users mobile devices 110. This setup is needed when the router 500 implements additional services such as AAA policy (Authentication, Authorization and Accounting), analytics, etc. The hardware configuration is exactly the same as the non-transparent bridge configuration. The only difference is a software component that is loaded (on the proxy 200) that makes this transparency. In some embodiments, IPTables+EBTables (software) techniques are used to make this transparency. Alternatively, custom drivers can be used which can make this operation faster.

Cloud Platform

Figure 7:
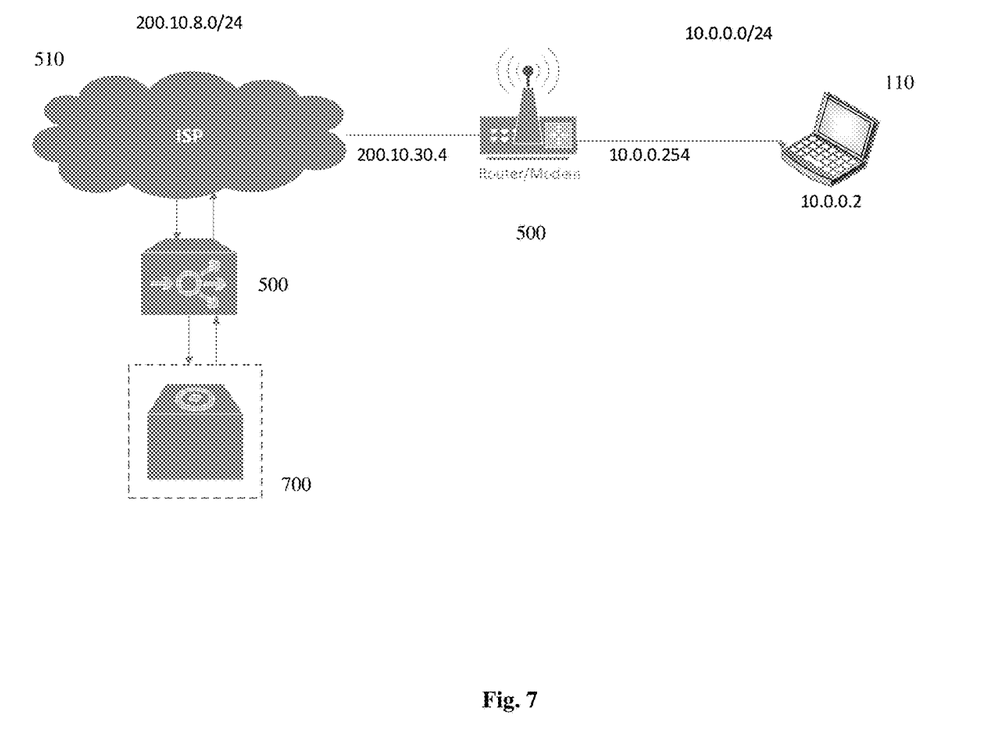
FIG. 7 shows an embodiment of a content-overlay system in a cloud-based configuration.

Here some or all of the operations are performed not on premises of the local network, but rather in remote server(s). In the example shown in FIG. 7 the ISP 510 offers the proposed content-overlay services using network redirection to its servers 700. The servers 700 can be behind a router 500 or controller or demilitarized zone (dmz).

Examples: modification of HTTP content may be used e.g. for the following applications:

Enterprise in-browser applications: file sharing, Instant Messaging and notifications;

In-Browser banner overlay for advertisement/promotions—enable adding freemium channels for paid Wi-Fi spots. For example, while flying from SFX to FRA passengers who seek Wi-Fi connectivity may be engaged with either dynamic responsive banners (advertisement or feedback), pop-ups, or tailor-made services that are location based.

Local call for action—in business payment and location-based advertising, allows Small and Medium Businesses (SMB's) to communicate with their customers through the router 500. For instance, a coffee place can allow clients that are connected to its Wi-Fi network to place orders using a form on top of any site in the browser of their mobile device 100, thereby to close and confirm an entire purchase cycle.

In-bound services over Wi-Fi may include one or more of the following examples:

1) Loyalty. For example, end-users logging on a Wi-Fi network are prompted to check in at the enterprise and may be granted a virtual "punch card"/loyalty card through their smart devices 110.

The enterprise subsequently can be provided, by the service of the invention, with names and status of end-users to facilitate greeting by name and/or customized services of individuals of groups of end-users based on pre-programmed rules. End-users may log on using social media e.g. Facebook accounts, which may then be employed to attract additional end-users associated with existing end-users.

2) Local e-commerce: Overlaid content can enable end-users to finalize purchases while on the local network as opposed needing to access a separate location for the e-purchase process.

3) Social WiFi features including Chat over browser and/or having a Facebook login.

4) Local enterprise Promotions: e.g. on end users' smart devices 110 when the smart device 110 is on location.

5) Analyses of end-user's location based statistics.

6) E-marketplace features e.g. Surveys, weather forecasts, geo-applications, geo-online contests e.g. comparing loyalties of end-users.

7). Geo-Fenced services—enterprise provides data over the WiFi, and can subsequently engage with end-users.

The overlaid content 120 can come in any shape, form, size, transparency etc. For example, a bubble per page in the browser (or splash page, banner or mini website) may open for services that an enterprise has registered for.

Figure 8:
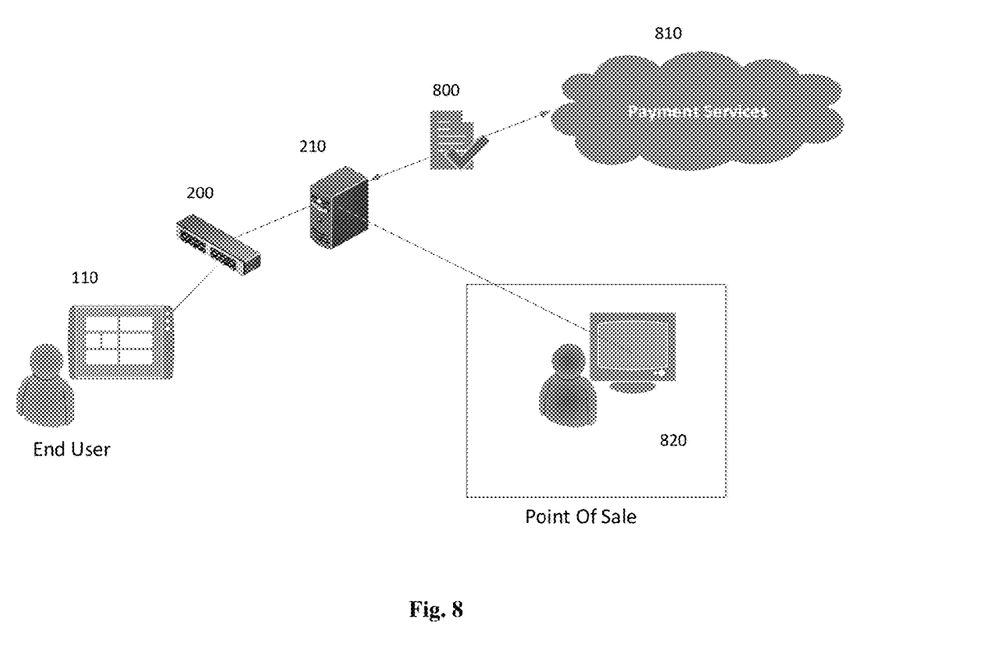
FIG. 8 shows an embodiment of a configuration enabling an end-user to make a purchase using the system of the invention.

Purchase Usage Scenario Examples:

Reference is made to FIG. 8 showing an embodiment of a configuration enabling an end-user to make a purchase using the system of the invention.

1. An end user is redirected by the content-overlay system to a website for a purchase 800 or can order directly from the content-overlay system.

2. The proxy 200 then either connects to a payment service 810 (e.g. PayPal™) or redirects the user to another server which connects to the payment service 810.

3. Upon successful payment the proxy 200 or server 210 are notified from the payment services 810 and notify the mobile device 110 (i.e a tablet on the counter) at the Point of Sale (POS) 820 about the e-purchase.

4. The merchant at the point of sale 820 receives the order and informs through the POS 820 to the end user that the order is being taking care of.

5. The end user receives a message that the order is in progress.

6. Upon finishing preparing the ordered item, the merchant through the point of sale 820 informs the end user that the order is ready to be collected or ships to end-user.

Usage Scenario Examples:

The system of the invention can be implemented for different market segments that provide WiFi as a service. Each segment, can thus provide a different service to the user, along with a custom graphic user interface (GUI). Some examples include:

Hotels:

A customer enters the hotel, logs into its Wi-Fi network, and then:

a) Can be notified when the room is ready;
b) Can be greeted at the entrance;
c) Can check-in/register on-line;
d) Can be updated via the browser on upcoming hotel events;
e) Can be sent to a loyalty page to insert information;
f) Can receive while arriving home or during stay a link to trip advisor for leaving a recommendation;
g) Can receive a survey of one question of how do they feel, the results will appear at the front desk for repairing damage while customer is still on premises (for example, bad food at breakfast, can be repaired with a token at dinner)
h) Give virtual real-estate for hotel stores to advertise themselves on people devices 110 based of databases in the system;
i) Order room service;
j) Inquire about hotel services, for example, opening hours for pool; and
k) Target audience by connecting to the hotel CMS.

SMB's:

Bars/Coffee Shops (Over the Counter—OTC)

A customer enters the place, logs into its Wi-Fi network, and then:

a) Can be updated via a browser on upcoming events;
b) Can be sent to a loyalty page to insert information and receive a loyalty card;
c) Can order from the menu and optionally pay;
d) Can register with his Tinder™ account for indoor socialization;
e) Can start a chat with the people around him;
f) Can get additional information on the menu (specials of the day, caloric values, promotions, recommendations etc.); and
g) Can be notified when the order is ready.

h) Can promote the business for its good service in TripAdvisor app (or alternatives Shopping Malls/Terminals A customer enters the place, logs into its Wi-Fi network, and then:

a) Can be updated via the browser on upcoming events;
b) Can be sent to a loyalty page to insert information and receive a loyalty card;
c) Can receive an indoor Groupon™ experience with targeted coupons;
d) Can search for the location of a particular store, brand, service;

The mall:

a) Can be provide access to customers for its stores; and
b) Can be updated via browser on upcoming events.

Sport Stadiums

A customer enters the place, logs into its Wi-Fi network, and then:

a) Indoor gambling application in real time;
b) Indoor food ordering application that is location-based;
c) Can start a chat with the people around him;
d) Can get more information about the current event;
e) Can purchase team memorabilia; and
f) Can access team and player history and statistics.

Conferences

A customer enters the place, logs into its Wi-Fi network, and then:

a) Can be updated via browser on upcoming events and conference schedule;
b) Can see the guests around at the venue;
c) Can see the guests in his vicinity;
d) Can check if friends/colleagues are present; and
e) Can check conference schedule and information.

Transportation\Aviation

A customer enters the place, logs into its Wi-Fi network, and then:

a) Can be updated via browser on the next stop;
b) Can order from the place menu (duty free) and optionally pay;
c) Can upgrade seat from economy to business in real time;
d) Can start a chat with the people around;
e) Can watch the entertainment system from his device 110; and
f) Can receive promotion according to destination (taxi, insurance, hotel, shopping etc.)

Smart Cities

A user enters the location, logs into its Wi-Fi network, and then:

a) Can be updated via browser on upcoming events;
b) Can use city services (pay tax, tickets etc);
c) Can target mainly tourists according to their browser behavior;
d) Can give ability to people from the same location to coordinate events, running times together etc.; and
e) Can provide stores with proximity to Hot spot with the ability to insert promotions.

Certain embodiments seek to provide a system for engagement with a local network whereby routers create a content overlay on each website and device, thereby to provide a content layer which allows engagement with clients (also termed herein "end-users") who may lack any application installation on their smart devices (e.g smartphone, tablets etc.).

Although the invention has been described in detail, nevertheless changes and modifications, which do not depart from the teachings of the present invention, will be evident to those skilled in the art. Such changes and modifications are deemed to come within the purview of the present invention and the appended claims.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" means any one or more microprocessors, central processing units (CPUs), computing devices, microcontrollers, digital signal processors, or like devices.

The term "computer-readable medium" refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method for HTTP (HyperText Transfer Protocol) content modification, comprising the following automatic steps:
   (a) receiving an HTTP "Content-Length" header from an HTTP server;
   (b) replacing the HTTP "Content-Length" header with a "Transfer-Encoding: chunked" header;
   (c) transmitting the "Transfer-Encoding: chunked" header to a client;
   (d) receiving an HTTP message body, in chunks, from the HTTP server, wherein the chunks are HTTP transfer-coding chunks, and, for each received chunk:
      (i) modifying the chunk by injecting a new HTML (HyperText Markup Language) element into the chunk, and
      (ii) transmitting the modified chunk to the client, such that the client displays a web page with content modified with the new HTML element,
   wherein the method reduces latency in the transmission of the HTTP message body to the client.

2. The method of claim 1, wherein the automatic steps are executed by a proxy server.

3. The method of claim 1, wherein the automatic steps are executed by one of: a router, and an access point.

4. The method of claim 1, further comprising, prior to step (a):
   receiving an HTTP request from the client; and
   transmitting the HTTP request to the HTTP server,
   wherein the HTTP "Content-Length" header received in step (a), and the HTTP message body received in step (d), are transmitted by the HTTP server responsive to the HTTP request.

5. The method of claim 4, further comprising:
   determining that steps (a) through (d) are to be executed, based on a header of the HTTP request.

6. The method of claim 5, wherein the header of the HTTP request contains at least one of:
   a predetermined URL (Uniform Resource Locator);
   a predetermined URL extension; and
   a predetermined "User-Agent".

7. The method of claim 1, further comprising:
   determining that steps (a) through (d) are to be executed, based on at least one of:
   a predetermined date; and
   a predetermined time.

8. The method of claim 1, further comprising:
   determining that steps (a) through (d) are to be executed, based on a predetermined "Content-Type" header received from the HTTP server.

9. A non-transitory computer-readable medium for HTTP (HyperText Transfer Protocol) content modification, having stored thereon instructions for:
   (a) receiving an HTTP "Content-Length" header from an HTTP server;
   (b) replacing the HTTP "Content-Length" header with a "Transfer-Encoding: chunked" header;
   (c) transmitting the "Transfer-Encoding: chunked" header to a client;
   (d) receiving an HTTP message body, in chunks, from the HTTP server, wherein the chunks are HTTP transfer-coding chunks, and, for each received chunk:
      (i) modifying the chunk by injecting a new HTML (HyperText Markup Language) element into the chunk, and
      (ii) transmitting the modified chunk to the client, such that the client displays a web page with content modified with the new HTML element,
   wherein the method reduces latency in the transmission of the HTTP message body to the client.

10. The non-transitory computer-readable medium of claim 9, wherein the instructions further comprise, prior to instruction (a):
    receiving an HTTP request from the client; and
    transmitting the HTTP request to the HTTP server,
    wherein the HTTP "Content-Length" header received in instruction (a), and the HTTP message body received in instruction (d), are transmitted by the HTTP server responsive to the HTTP request.

11. The non-transitory computer-readable medium of claim 10, wherein the instructions further comprise:
    determining that steps (a) through (d) are to be executed, based on a header of the HTTP request.

12. The non-transitory computer-readable medium of claim 11, wherein the header of the HTTP request contains at least one of:
    a predetermined URL (Uniform Resource Locator);
    a predetermined URL extension; and
    a predetermined "User-Agent".

13. The non-transitory computer-readable medium of claim 9, wherein the instructions further comprise:
    determining that instructions (a) through (d) are to be executed, based on at least one of:
    a predetermined date; and
    a predetermined time.

14. The non-transitory computer-readable medium of claim 9, wherein the instructions further comprise:
    determining that steps (a) through (d) are to be executed, based on a predetermined "Content-Type" header received from the HTTP server.

15. A device comprising:
    a processor; and
    a non-volatile computer-readable medium having stored thereon instructions that are executable by said processor for:
    (a) receiving an HTTP "Content-Length" header from an HTTP server;
    (b) replacing the HTTP "Content-Length" header with a "Transfer-Encoding: chunked" header;
    (c) transmitting the "Transfer-Encoding: chunked" header to a client;
    (d) receiving an HTTP message body, in chunks, from the HTTP server, and, for each received chunk:
       (i) modifying the chunk by injecting a new HTML (HyperText Markup Language) element into the chunk, and (ii) transmitting the modified chunk to the client, such that the client displays a web page with content modified with the new HTML element,
wherein the method reduces latency in the transmission of the HTTP message body to the client.

16. The device of claim 15, wherein the instructions further comprise, prior to instruction (a):
receiving an HTTP request from the client; and
transmitting the HTTP request to the HTTP server,
wherein the HTTP "Content-Length" header received in instruction (a), and the HTTP message body received in instruction (d), are transmitted by the HTTP server responsive to the HTTP request.

17. The device of claim 16, wherein the instructions further comprise:
determining that steps (a) through (d) are to be executed, based on a header of the HTTP request.

18. The device of claim 17, wherein the header of the HTTP request contains at least one of:
a predetermined URL (Uniform Resource Locator);
a predetermined URL extension; and
a predetermined "User-Agent".

19. The device of claim 15, wherein the instructions further comprise:
determining that instructions (a) through (d) are to be executed, based on at least one of:
a predetermined date; and
a predetermined time.

20. The device of claim 15, wherein the instructions further comprise:
determining that steps (a) through (d) are to be executed, based on a predetermined "Content-Type" header received from the HTTP server.

* * * * *